(12) United States Patent
West

(10) Patent No.: US 7,627,518 B1
(45) Date of Patent: Dec. 1, 2009

(54) SYSTEM AND METHOD FOR EVENT DRIVEN VIRTUAL WORKSPACE

(75) Inventor: Robert A. West, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 11/415,395

(22) Filed: May 1, 2006

Related U.S. Application Data

(63) Continuation of application No. 10/701,235, filed on Nov. 4, 2003.

(51) Int. Cl.
*G06Q 40/00* (2006.01)
*G06F 3/048* (2006.01)

(52) U.S. Cl. .......................... 705/37; 705/35; 715/764; 715/765; 715/766; 715/767; 715/788; 715/790; 715/791

(58) Field of Classification Search ................. 715/761, 715/762, 765, 766, 767, 778, 794, 796, 797, 715/764, 788, 790, 791; 705/37, 35
See application file for complete search history.

(56) References Cited

U.S. PATENT DOCUMENTS

| | | | | |
|---|---|---|---|---|
| 5,339,392 | A * | 8/1994 | Risberg et al. | 715/762 |
| 5,914,715 | A * | 6/1999 | Sasaki | 715/803 |
| 6,031,530 | A * | 2/2000 | Trueblood | 715/791 |
| 6,772,132 | B1 | 8/2004 | Kemp, II et al. | |
| 6,874,126 | B1 * | 3/2005 | Lapidous | 715/711 |
| 7,068,288 | B1 * | 6/2006 | Good et al. | 345/619 |
| 7,082,398 | B1 * | 7/2006 | Apple et al. | 705/1 |
| 7,127,424 | B2 | 10/2006 | Kemp, II et al. | |
| 7,146,615 | B1 * | 12/2006 | Hervet et al. | 719/318 |
| 7,158,951 | B2 * | 1/2007 | Stark | 705/37 |
| 7,185,290 | B2 * | 2/2007 | Cadiz et al. | 715/838 |
| 7,228,289 | B2 * | 6/2007 | Brumfield et al. | 705/35 |
| 7,231,630 | B2 * | 6/2007 | Acott et al. | 717/105 |
| 2001/0049651 | A1 * | 12/2001 | Selleck | 705/37 |
| 2003/0058277 | A1 * | 3/2003 | Bowman-Amuah | 345/765 |
| 2004/0117292 | A1 | 6/2004 | Brumfield | |

* cited by examiner

*Primary Examiner*—Jagdish N Patel
*Assistant Examiner*—Kenneth L Bartley
(74) *Attorney, Agent, or Firm*—McDonnell Boehnen Hulbert & Berghoff LLP

(57) ABSTRACT

A system and method for an event driven virtual workspace are described. According to one example method, a trader can define a plurality of windows to be associated with a virtual workspace. Also, the trader could define one or more triggering events, the combination of which may be used to activate the virtual workspace. In such an embodiment, when the system detects the one or more triggers, the system can attempt to activate the virtual workspace. According to the example method, the trader may place a number of limiting conditions before any states of the currently displayed windows are modified such that the triggered virtual workspace could be displayed. If no limiting conditions are detected, the system can display the triggered virtual workspace.

12 Claims, 7 Drawing Sheets

SYSTEM AND METHOD FOR EVENT DRIVEN VIRTUAL WORKSPACE

CROSS REFERENCE TO RELATED APPLICATION

This application is a continuation of U.S. patent application Ser. No. 10/701,235 filed Nov. 4, 2003, entitled "System and Method for Event Driven Virtual Workspace," the contents of which are fully incorporated herein by reference.

FIELD OF INVENTION

The present invention is directed towards electronic trading. More specifically, the present invention is directed towards user-configurable and event-driven workspaces.

BACKGROUND

In recent years, a trend towards electronic trading has become well-established, causing one major exchange after another to replace or at least supplement the traditional open outcry, where a trade is done face to face, with automated, electronic systems which automatically match bids and offers. While the motivation behind using electronic trading may vary from market to market, greater efficiency and volume are some of the considerations.

Electronic trading is generally based on a host exchange, one or more computer networks and client devices. In general, the host exchange includes one or more centralized computers to form the electronic heart. The exchange allows a trader to participate in trading at least one tradeable object, and conducts matching of bids and offers that are placed by the subscribing traders for that tradeable object. Typically, subscribing traders connect to an exchange by way of a communication link and through an application program interface to establish real-time electronic messaging between the exchange and their terminals. The real-time electronic messaging includes market information that is sent from an electronic market to the traders.

An electronic exchange can list any number of tradeable objects. Often times, traders will simultaneously trade more than one tradeable object, and they may simultaneously trade tradeable objects that are listed at more than one exchange. Ordinarily, each tradeable object has its own separate stream of market information. Therefore, in these instances, the traders will generally receive more than one stream of market information such that each stream of market information will characterize a given tradeable object. In addition to receiving market information from exchanges, a trader could also subscribe to news feeds to receive real-time quotations that may assist the trader in making his trading decisions.

Generally, when a trader submits an order to a host exchange, the host checks the conditions associated with the order, for example, price and quantity, and prioritizes the order with other orders at the same price. When the order conditions are satisfied in the market, a trade occurs and the trade information is then relayed in some fashion to one or more client devices such that traders can have access to the most current market information.

Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all or many price levels, while some provide only quantities associated with the inside market, and others may provide no market depth at all. Additionally, host exchanges can offer other types of market information such as the last traded price ("LTP"), the last traded quantity ("LTQ"), and user-specific information such as order fill information that is sent to a user associate with the filled order.

Traders interact with electronic exchanges using trading screens. Trading screens allow traders to view market information as well as any news or charting applications on which traders may base their trading actions. Upon viewing the provided information, traders may use trading screens to take certain actions including the actions of sending buy or sell orders to one or more electronic exchanges, adjusting existing orders, deleting orders, or otherwise managing orders. Traders may also use software tools on their client devices to automate those and additional actions.

In many instances, spotting an opportunity in the market and capitalizing on it before the market moves or before a competing trader does can separate those traders who are successful from those who are not. Often, trading schemes require monitoring of market information related to multiple tradeable objects, as well as monitoring news and/or charts from many different sources. An important component in capitalizing on an opportunity involves quickly assimilating information and then quickly acting on that information to get the order to the exchange for matching. In many instances, the size of a trading screen limits the number of windows or the amount of information that can be simultaneously displayed to a trader. As the number of tradeable objects being traded by a trader increases, the ability of the trader to quickly access and view desired information will be therefore further reduced.

Thus, it is desirable for electronic trading applications to offer tools that can assist a trader in trading in an electronic trading environment, help the trader making profitable trades in a speedy and accurate manner, while allowing the trader to control the trading screen display.

BRIEF DESCRIPTION OF THE DRAWINGS

Example embodiments of the present invention are described herein with reference to the following drawings, in which.

DETAILED DESCRIPTION

I. Virtual Workspace Overview

A system and method are developed for providing an event driven virtual workspace. According to one method, a trader may first define a number of characteristics for one or more virtual workspaces. In one embodiment, a trader can characterize a virtual workspace by defining a number of windows to be associated with the workspace, as well as one or more triggering events, the combination of which can be used to trigger the activation of the virtual workspace on one or more screens. A trader could also predefine a layout of all windows on a virtual workspace such that, when the workspace is activated, the windows can be displayed in trader-defined locations on a display screen.

Once a trader defines a virtual workspace, a system can start monitoring triggering events associated with the workspace. When the system detects one or more events associated with the trigger activating a virtual workspace, the system can automatically attempt to activate the workspace on one or more screens being used by the trader. Also, according to example embodiments, a trader could define a number of limitations as to when and which currently displayed windows can be replaced with other windows associated with a virtual workspace. Such limitations that control the status changes of the displayed windows can be based on many different user-defined or system-preset criteria. For example, some limitations may be based on user-actions, such as detecting mouse movements or user inputs in relation to a window. Additional example limitations, as well as the operation of the event-driven virtual workspaces, will be described in greater detail below.

While the present invention is described herein with reference to illustrative embodiments for particular applications, it should be understood that the present invention is not limited thereto. Those having ordinary skill of art will recognize that many additional modifications and embodiments are possible as well.

II. Hardware and Software Overview

Figure 1:
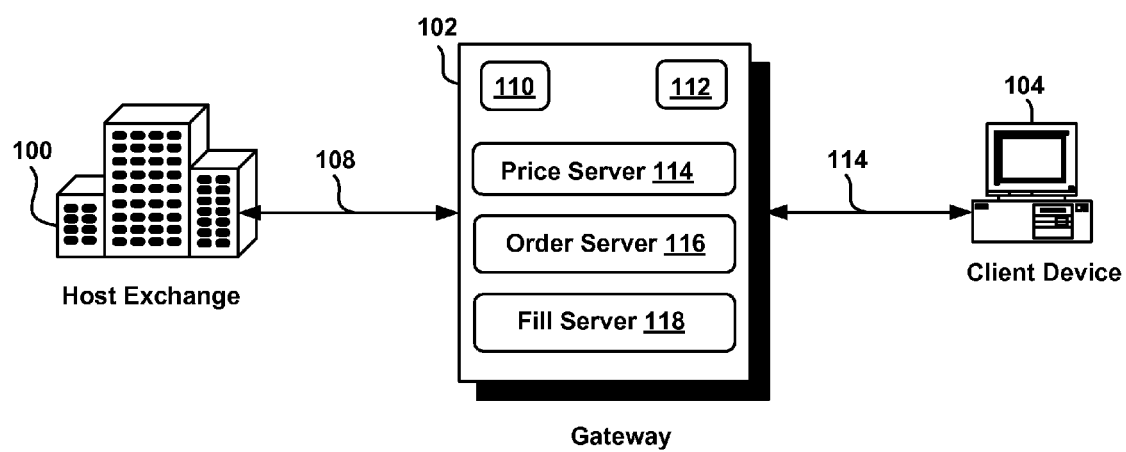
FIG. 1 is an example network configuration for a communication system utilized to access one or more exchanges.

FIG. 1 is a block diagram illustrating an example trading system 100 in accordance with the preferred embodiments. The system 100 includes a host exchange 100, a gateway 102, and a client device 104. However, it should be understood that more than one client device could connect to a plurality of exchanges via a plurality of gateways, and FIG. 1 illustrates a simplified system.

Although each referenced component in FIG. 1 is described directly below in their respective sections, it should be understood that the components may take the form of an entirely hardware embodiment, an entirely software embodiment, or an embodiment combining software and hardware aspects. Furthermore, some of the components of FIG. 1 may take the form of a computer readable medium having a computer readable program code means embodied in a storage medium. Any suitable computer readable medium may be utilized including hard disks, CD-ROMS, optical storage devices, or magnetic storage devices. Also, it should be understood that the preferred embodiment may be implemented on many other system configurations.

A. Exchange

Host exchange 100 may include, for example, the London International Financial Futures and Options Exchange ("LIFFE"), the Chicago Board of Trade ("CBOT"), the New York Stock Exchange ("NYSE"), the Chicago Mercantile Exchange ("CME"), the Exchange Electronic Trading ("Xetra," a German stock exchange), or the European exchange ("Eurex"). Exchange 100 might also refer to other known facilities that automatically match incoming orders that are received from client device. The example exchanges and other exchanges are well known in the art.

Exchange 100 allows traders to trade tradeable objects that exchange 100 offers for trading. As used herein, the "tradeable object" refers simply to anything that can be traded with a quantity and/or price. It includes, but is not limited to, all types of tradeable objects such as financial products, which can include, for example, stocks, options, bonds, futures, currency, and warrants, as well as funds, derivatives, and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of tradeable objects, such as a class of tradeable object.

According to the preferred embodiments, to keep participating traders informed of changes in a market, exchange 100 relays market information over a transmission channel 108 to client device 104 via gateway 102. Transmission channel 108 can include any connection types being used by exchange 100, such as a T1 line, for example, and the transmission channel can carry information in either analog or digital format. It should be understood that exchange 100 could use a number of different communication protocols for connecting and sending market information to client devices. For example, exchange 100 can connect to client device 104 using TCP/IP, and can provide market information using the Financial Information exchange (FIX) protocol, which is a messaging standard developed specifically for real-time electronic exchange type transactions. FIX is a public-domain specification owned and maintained by FIX Protocol, Ltd.

Market information that exchange 100 sends to client device 104 via gateway 102 may include data that represents just the inside market, where the inside market is the lowest sell price (best offer) in the market, and the highest buy price (best bid) in the market at a particular point in time. Market information may also include market depth, where market depth refers to quantities available at the inside market and can also refer to quantities available at other prices away from the inside market. It should be understood that market information can also contain other types of market information such as the last traded price ("LTP"), the last traded quantity ("LTQ"), and/or any trader related information, such as fill information, associated with a trader receiving a particular data feed.

Once a trader submits an order to an exchange, the exchange may process the order using different execution algorithms, and the type of algorithm used may depend on the tradeable object being traded. Some example order execution algorithms include first-in-first-out ("FIFO") and pro rata algorithms. The FIFO algorithm, used for some tradeable objects listed with Eurex, for example, gives priority to the first person in an order queue at an exchange to place an order. The pro rata algorithm, used for some tradeable objects listed with LIFFE, for example, splits orders for the same price, and the orders at identical prices are filled in proportion to their size. Also, it should be understood that the price order queue is a term that covers a broad range of systems used by an exchange to conduct orderly financial transactions such as, for example, a FIFO based system or a pro rata system. Also, the present invention is not limited to any particular type of order execution algorithm, and different algorithms could also be used.

B. Gateway

According to the preferred embodiment, gateway 102 can be a computer running software that receives market information and order information from host exchange 100. As used herein, a computer includes any device with memory 110 and a processor 112 capable of processing information to produce a desired result. Thus, gateway 102 can be a computer of any size such as a server, workstation, personal computer, or laptop, but, generally, gateway 102 can be any computer device that has the processing capability to perform the function described herein. Also, it should be understood that the functions of gateway 102 could be moved to host exchange 100 and/or client device 104 to reduce or eliminate the need for gateway 102.

In the preferred embodiment, gateway 102 receives market information as well as order related data from host exchange 100, and forwards the received data to client device 104. In one embodiment, while market information may be transmitted between exchange 100 and client device 104 using multicast transmission, order related information, such as order fills and order requests, are typically sent using unicast transmission. As known in the art, while the multicast allows for communication between a single sender and multiple receivers in the network, the unicast only allows for communication between a single sender and a single receiver. It should be understood that while there are many possible protocols that can be used to multicast and unicast information between exchange 100 and client device 104 via gateway 102, the Pragmatic General Multicast ("PGM") protocol could be used for multicasting, and the Point to Point Protocol ("PPP") could be used for unicasting, for example.

Also, as known by those skilled in the art, gateway 102 may have one or more servers to support data feeds that are received from exchange 100. In one embodiment, gateway 102 may include a price server 114 for processing price information, an order server 116 for processing order information, and a fill server 118 for processing fill information. Generally, a server is software that responds to commands from client device 104 in the form of subscription. That is, a trader at client device 114 can subscribe to price information, order information, and fill information for a particular tradeable object being offered at host exchange 100. In one embodiment, the subscription may be established via a process of sending a number of messages between client device 104 and gateway 102. For example, gateway 102 may first authenticate a trader at client device 104, and then client device 104 may establish separate communication links, such as IP links, to each server at gateway 102. In the embodiment illustrated in FIG. 1, client device 104 would establish three separate IP connections to three servers at gateway 102.

Price server 114, order server 116, and fill server 118 receive information from exchange 100. According to a preferred embodiment, price server 114 may receive and process price information related to one or more tradeable objects being offered at exchange 100, while order server 116 may receive and process order related information. In one embodiment, exchange 100 may be connected to gateway 102 using two communication links, a first link between exchange 100 and price server 114, and a second link between exchange 100 and order server 116. In such an embodiment, a separate connection may exist between order server 116 and fill server 118 such that, when the order information that is received at order server 116 includes any fill related information, order server 116 may pass the fill data to fill server 118, which may then process and send the fill data to client device 104.

C. Client Device

Client device 104 can be a computer such as a workstation, desktop, laptop, hand-held device, personal digital assistant ("PDA"), smart phone, any other wired or wireless communication device, and so forth, that allow a trader to trade one or more tradeable objects that are offered at exchange 100. Client device 104 may include at least processor and memory. The processor and memory, which are both well-known computer components, are not shown in the Figure for sake of clarity. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer-readable media include, for example, floppy disks, flexible disks, hard disks, magnetic tape, punch cards, CD-ROM, a RAM, a PROM, an EPROM, a FLASH-EPROM, and any other memory chip or cartridge, or any other medium from which a computer can read.

Client device 104 can communicate with gateway 102 via different networks, such as a Local Area Network ("LAN"), a Wide Area Network ("WAN"), or a wireless network via a Virtual Private Network ("VPN"), for example, or a combination thereof. Also, gateway 102 and client device 104 can communicate order and market related information using any messaging protocols, such as any proprietary messaging protocols. However, it should be understood that different networks and different messaging protocols could also be used.

When client device 104 receives market information and order related information from exchange 100, the received information may be displayed to the trader(s) on the visual output device or display device of client device 104. The output device can be any display type. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into client device 104 such as by typing into a keyboard, inputting commands through a mouse, or inputting commands or signals through some other input device. For instance, a trader may click a mouse button to initiate an order to buy a particular quantity of the tradeable object at a particular price. Then, client device 104 preferably generates transaction information. There are many different types of messages and/or order types that can be submitted, all of which may be considered various types of transaction information. Once generated, transaction information is sent from client device 104 to host exchange 100 over communication links.

In the preferred embodiment, client device 104 uses software to create specialized interactive trading screens on terminals associated with them. Trading screens preferably enable traders to, among other things, enter and execute orders, obtain market quotes, and monitor positions. The range and quality of features available to the trader on his or her trading screens may vary according to the specific software application being run. In addition to or in place of the interactive trading screens, client device 104 could run automated non-interactive types of trading applications.

The preferred embodiment may be implemented on any type of trading screen, therefore, details regarding the trading screen are not necessary to understand the present invention. However, in one embodiment, one type of trading screen that can be used is provided by a commercially available trading application referred to as X_TRADER® from Trading Technologies International, Inc. of Chicago, Ill. X_TRADER® also provides an electronic trading interface, referred to as MD TRADER™, in which working orders and/or bid and ask quantities are displayed in association with a static price axis or scale. Portions of the X_TRADER® and the MD TRADER™-style display are described in U.S. patent application Ser. No. 09/590,692, now U.S. Pat. No. 6,772,132, entitled "Click Based Trading With Intuitive Grid Display of Market Depth," filed on Jun. 9, 2000, U.S. patent application Ser. No. 09/971,087, now U.S. Pat. No. 7,127,424, entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. However, it should be understood that orders in the system illustrated in FIG. 1 could also be placed using any other trading application as well. Additionally, the preferred embodiments are not limited to any particular product that performs translation, storage, and display function.

Also, a trader at the client device 104 might subscribe to one or more news services to receive news feeds such as Bloomberg and Reuters, and/or the trader might subscribe to real-time quotation vendors that provide information to traders for decision support. However, it should be understood that traders could subscribe to other news and information sources, all of which are collectively referred to as news data.

Figure 2:
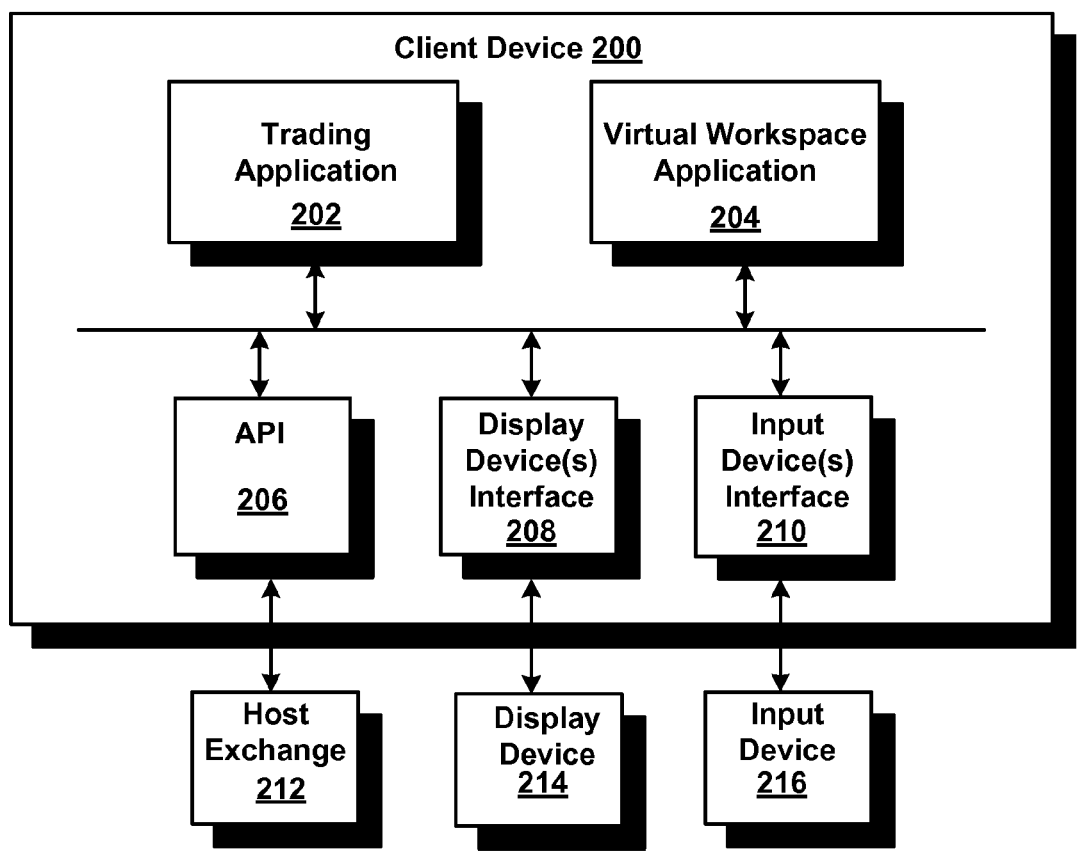
FIG. 2 is a block diagram illustrating an example client device that can be used in the example network of FIG. 1.

FIG. 2 is a block diagram illustrating an example client device 200, which may be similar to the type of client device 104 shown in FIG. 1. The client device 200 can be any particular type of computing device, examples of which were enumerated above with respect to the client device. According to the preferred embodiments, the client device 200 has a trading application 202 stored in a memory unit that when executed arranges and displays market information in many particular ways, usually depending on how the trader prefers to view the information.

Client device 200 also includes a virtual workspace application 204 that can implement the embodiments of the event-driven virtual workspaces described herein. More specifically, and as will be described in greater detail below, the virtual workspace application 204 can automatically activate and deactivate virtual workspaces upon detecting one or more triggers associated with the workspaces. The virtual workspace application 204 can also monitor a number of limiting conditions that can be used to prevent the activation of a new workspace in place of the currently displayed virtual workspace.

Preferably, the trading application 202 and the virtual workspace application 204 have access to market information through an application programming interface ("API") 206, and the trading application 202 could also forward transaction information to the exchange 212 via the API 206. Alternatively, the API 206 could be distributed so that a portion of the API 206 rests on the client device 200 and a gateway, or at the exchange 212. Additionally, the trading application 202 and the virtual workspace application 204 could receive other information through the API 206, such as news or numbers from outside sources other than the exchange 212.

Additionally, the trading application 202 and the virtual workspace application 204 could receive signals from an input device 216 via an input device interface 210, and can be given the ability to send signals to a display device 214 via a display device interface 208.

III. Event-Driven Virtual Workspace

Figure 3:
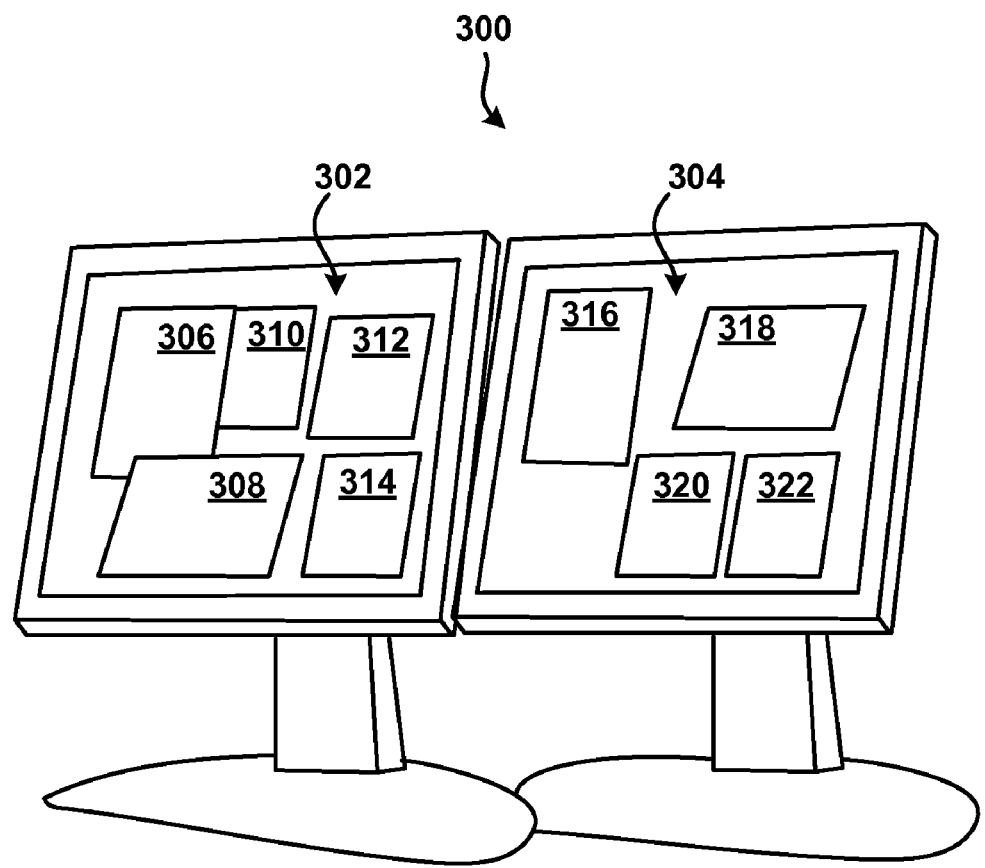
FIG. 3 is a block diagram illustrating two example monitors that a trader may use with the present embodiments.

FIG. 3 is a block diagram 300 showing two example monitors that a trader could use with the present embodiments. It should be understood that the example embodiments are not limited to any number of monitors and more or fewer monitors could also be used depending on the user's trading preferences. In FIG. 3, monitors 300 resemble an LCD-based or a gas plasma-based flat-panel often used with desktop computers or docking stations for laptop computers. However, any monitor or display device (e.g., a display device represented by block 214 in FIG. 2) on which images may be generated could also be used. Therefore, it should be understood that the present embodiments are not limited to any particular type of display device, but for sake of illustration some example display devices include a cathode ray tube (CRT), a projector or multiple projectors that can be used to a create a tiled display with an overlapping projection, a display made up of light emitting diodes (LEDs), or some other types of displays, such as passive output devices.

The monitors 300 include display screens 302 and 304, respectively. A display screen is a visual output of a monitor. In general, display screens 302 and 304 remain static while other elements on the screens 302 and 304 can change. Display screens 302 and 304 display a number of windows 306-314 and 316-322, respectively.

As known in the art, every graphical-based application creates at least one window that serves as an interface between a user and the application. The embodiments described hereinafter are described in reference to windows, however, it should be understood that the present invention is not limited to displaying windows, and different graphical user interfaces or non-window based messaging or icons could also be used as part of virtual workspaces.

Many applications may also create windows to perform tasks related to the main window, and each window may display output as well as receive input from a user. The displayed output may include text or graphics such as news updates or any charts or graphs that are provided by applications running on a client device or outside sources. Each window can have a number of predefined attributes such as a window's style, position, or size, for example. A window's style defines different aspects of the window's appearance and behavior. A window's position may be defined as the coordinates of its upper left corner in relation to some predefined location on a display. Then, a window's size may vary based on a size of a display interface. However, some applications may create windows with a client area having a particular minimum size due to the visibility limitations associated with each window.

In addition to the window's size, position, and style, there are many ways to control a window's position in relation to other windows. For example, some windows could be foreground windows while others could be background windows.

Typically, each process can create multiple windows. The window with which the user is currently working is called a foreground window, and all other windows are called background windows. Also, a user can at any time set a foreground window by clicking any displayed windows or selecting a predetermined key combination.

In addition to setting a window as a foreground or background window, the window's position in a stack of the overlapping windows can be controlled by the z-order associated with each window. It can be assumed that the window stack is oriented along an imaginary axis, a z-axis that extends outward from the screen. In such a configuration, windows at the top of the z-order overlap the windows at the bottom of the z-order. Typically, when an application creates a window, the created window is placed at the top of the z-order for windows of the same type. However, the z-orders of the windows could also be rearranged using predefined functions. Also, a user can change the existing z-order of a set of windows by activating one of the windows that will be subsequently positioned at the top of the z-order associated with windows of the same type.

Also, at any given time, a window can have different states. For example, a window can be active or inactive/disabled, maximized or minimized, hidden or visible, or restored. An active window is the top-level window of an application with which a user is currently working. To enable a user to easily identify an active window, the system can change colors of a title bar or a border of the active window to the system-defined colors, and may place the active window at the top of the z-order. A window can also be disabled. A disabled window receives no keyboard or mouse input from the user, but it can receive messages from other windows, applications, or from the system. For example, an application can disable a window to prevent a user from selecting one or more selection inputs associated with the window.

Windows can also be visible or hidden. The system displays visible windows on the screen and hides hidden windows. Unlike a visible window, if a window is hidden, a window is not displayed on a screen, and a user cannot enter any inputs to the window or to view the window's output. However, even though the window is hidden, it may still process messages from the system or from other windows. An application can set a visibility state for a window when it creates the window, and then can change the visibility state at a later time.

Finally, a user may wish to change the size of some windows that are displayed via a display interface. The size changes may include maximizing or minimizing some windows. A maximized window is a window that fills the full screen. Alternatively, if a window is linked to another window, such that one of the windows is a "child" window of a "parent" window, the child window may be effectively clipped to the size of the parent window such that no part of the child window ever appears outside the area of the parent window. In such an embodiment, when the child window is maximized, the size of the parent window controls the size of the maximized child window. When a user minimizes a window, the system may display the window in a form of an indicator on a taskbar. However, alternatively, an indicator associated with the minimized window does not necessarily have to be displayed on the taskbar.

An application can also control the size and position of its windows. For example, an application can specify a window's initial size and position when it creates the window. However, the window's size and position can be changed at any time either by the application or by a user. An application could also configure its windows such that each window is associated with the maximum and minimum possible size that can be set by a user dragging the window's sizing border, for example.

Referring back to FIG. 3, the size of displays 302 and 304 associated with each monitor is often a limiting factor as to how many windows associated with one or more applications can be simultaneously opened and effectively viewed by a trader. The use of multiple monitors as illustrated in FIG. 3 solves the problem only partially since, even thought the effective area that can be used for displaying various windows increases, a trader could still have problems to mentally integrate various pieces of information displayed on the multiple screens. To be successful, a trader in an electronic trading environment must be able to assimilate large amounts of market information, and most importantly, react more quickly than other competing market participants.

According to example embodiments, a trader may define a number of virtual workspaces including a plurality of windows, and each virtual workspace can be controlled by one or more triggering events defined by the trader. A virtual workspace, as used herein, may include a collection of windows associated with multiple and unrelated applications. For example, the virtual workspace may include a plurality of windows associated with trading applications, such as one or more windows associated with trading interfaces enabling a trader to trade multiple tradeable objects, and other windows associated with charting applications. Each set of windows associated with a virtual workspace may be treated as a collection of windows against which a system may apply a plurality of actions upon detecting one or more events defined by a trader and triggering the certain actions.

It should be understood that triggers may be based on many different market-related, trader-related, news-related, time-based, or different events. Market-related triggering events may include any events related to one or more tradeable objects such as prices of one or more tradeable objects moving out of some specific range, prices moving at all, or markets crossing. The trader-related triggering events may include detecting a predetermined profit/loss ("P/L") level, a predetermined net position, an available credit, a combination thereof, or any other trader-related events. The news-related triggering events may include detecting an announcement of predetermined numbers, such as unemployment numbers, or detecting a number being at some predetermined, user-defined level. The time-based triggers may be activated upon detecting a specific time during a trading session, for example. Also, a trigger activating or deactivating a certain virtual workspace may be based on a Boolean expressions defining one or more conditions that when satisfied trigger the activation or deactivation of the certain virtual workspace.

However, it should be understood that triggering events are not limited to automatically detected events. Alternatively, triggering events may take a format of user actions, such as a user selecting a specific key or a combination of keys. In such an embodiment, different key combinations could be associated with different virtual workspaces, and selecting a specific key combination could enable a trader to easily switch between a workspace that is currently displayed on a display and a workspace associated with the selected key combination.

Also, as mentioned earlier, once the system detects one or more triggering events associated with a predetermined virtual workspace, the system may take certain actions that may vary based on the configuration or user preferences. In one embodiment, a trader could define "trigger on" states, such as certain window states to be activated upon detecting one or more triggers, as well as "trigger off" states, such as window states to be activated upon detecting an expiration of the one or more triggers. It should be understood that the "trigger on" and "trigger off" states could be window-specific or workspace-specific.

In one embodiment, some of the actions that can be applied to the displayed windows may include modification of the window's size, location, z-order, or transparency, for example. Also, a window may be configured such that it will always stay on top of other windows regardless of the z-order of other windows. Alternatively, upon detecting a predetermined trigger, the windows' format or color can change, or a predetermined collection of windows can start flashing. It should be understood that if the window changes involve color or format changes, such changes may be based on predefined user-configured rules. Also, in another embodiment, a set of indicators can be displayed in association with a collection of windows upon detecting one or more triggers. It should be understood that some window changes may be limited to those changes that are permitted by an operating system being used by a trader. Additionally, some window changes may be application specific.

In an embodiment using multiple monitors, all or some windows displayed in relation to one of the monitors may be swapped with windows being displayed on another monitor, such as the monitor being currently used by a trader. For example, a monitor in relation to which the system has detected a mouse movement within some predefined time period may be designated as the currently used monitor. Alternatively, a trader can assign different workspaces to different monitors such that, upon detecting one or more triggers associated with a workspace, the workspace can be activated on a monitor that was pre-assigned to the workspace.

Also, the focus of different windows can be changed depending on whether a window is associated with a virtual workspace that is currently displayed on a display screen. Changing the focus of different windows may include changing the sharpness or intensity of some colors that are used in relation to one or more windows; however, different methods for changing the focus of different windows could also be used. Also, the focus could be changed depending on the user preferences. In addition to changing the focus of each window, a user could also define window transparency levels for a set of overlapping windows associated with a virtual workspace.

It should be understood that a user could place a number of limitations as to when and which currently displayed windows can be replaced with other windows associated with a virtual workspace. The limitations that control the status changes of the displayed windows can be based on many different user-defined or system-preset criteria. The existence of such limitations may be crucial in certain situations where the interruption to the trader's work could have potentially adverse consequences. For example, stealing the focus of a trading interface being currently used by a trader, or replacing such interface with another window, may be harmful to a trader in some situations.

It should be understood that many different limitations could be defined in relation to virtual workspaces. For example, some limitations may be based on user-actions. The limitations based on user-actions can include detecting a mouse movement in relation to a specific window within a predetermined time period before detecting one or more triggers that trigger the activation of a virtual workspace. Once such mouse movements are detected in relation to one or more windows, such windows may be tagged with always on top identifiers that can prevent the windows from getting deactivated in order to display a new virtual workspace, for example. In such an embodiment, once a window is tagged with an always on top identifier, the window may be assigned the highest z-order. However, it should be understood that the always on top identifier may be disabled upon detecting one or more triggering events associated with different workspaces.

In one embodiment, a trader could configure valid mouse movements that may initiate the process of tagging certain windows with always on top identifiers or equivalent identifiers that would prevent other windows from being placed on top of the tagged windows. The valid mouse movements can be characterized based on a direction of the mouse movements, for example. In one embodiment, the horizontal or vertical mouse movement could be considered as invalid mouse movements, while mouse movements at some angles could be considered valid. A trader could also define different sensitivity levels for mouse movements, such as how fast a trader moves a mouse, which may also affect a determination of whether the mouse movement is valid. Additionally, rather than tracking the mouse movement, a mouse position may affect which windows are tagged with the always on top identifiers. For example, as long as a mouse is positioned over a window, such window may be tagged with an always on top identifier, and no other window will overlay the tagged window.

Alternatively, rather than tracking the mouse movements or mouse positions, a window can be tagged with an always on top identifier upon detecting one or more predefined actions in relation to a specific window. The actions may include detecting a certain user input in relation to a window within some predetermined time period. However, it should be understood that the always on top identifier could be only temporarily assigned to a window, and the window may return to its initial pre-assignment state once certain actions that have triggered the assignment are no longer present.

The limiting conditions could be also divided into two groups, such as workspace-specific and/or window-specific limiting conditions. In such an embodiment, a trader could also set priority levels for limiting conditions, such that a limiting condition associated with one of the windows can override any conditions specified for the entire workspace, and vice versa. For example, if a workspace includes the combination of the two limiting condition types, upon detecting one or more triggers activating a display of a new virtual workspace, the virtual workspace application may first determine if there are any workspace related limiting conditions and then if there are any window-specific limiting conditions. The virtual workspace application may then determine a controlling condition based on the specified priority level. For example, if the currently displayed virtual workspace does not include any limiting conditions, and the limiting condition associated with one of the displayed windows does not permit for overriding that window with any other window, the virtual workspace application may deactivate other windows associated with the workspace except for the window associated with the limiting condition.

Also, it should be understood that a number of windows associated with a virtual workspace may be linked and may share the same characteristics, such as a z-order or an always on top identifier. Alternatively, each of the linked windows can have different characteristics that can change upon detecting different triggers. However, it should be understood that the window changes described above are only examples, and those skilled in the art will understand that different embodiments are possible as well.

Also, rather than or in addition to limiting a display of a virtual workspace based on user actions detected in relation to one or more windows or based on predefined characteristics associated with each window, a user may be notified every time a new workspace is to be displayed in place of another currently displayed workspace. In such an embodiment, before any windows associated with an activated workspace can replace any other currently displayed windows, the virtual workspace application may first notify a trader that one or more triggering events associated with the virtual workspace has been detected. Then, once the trader is notified, and the virtual workspace application detects a user action indicating that the trader wishes to have the virtual workspace activated, the workspace application may activate the new workspace. It should be understood that the notification can take many different formats such as flashing one or more windows, displaying a message or an indicator in relation to one or more currently active windows, or playing a sound associated with a workspace to be activated on a display screen, for example. Also, the user action activating the virtual workspace can take many different formats. In one embodiment, the user action can include selecting one or more keys, or selecting an indicator that can be displayed in relation to a virtual workspace. However, it should be understood that the user notifications and actions could take different formats as well.

Figure 4:
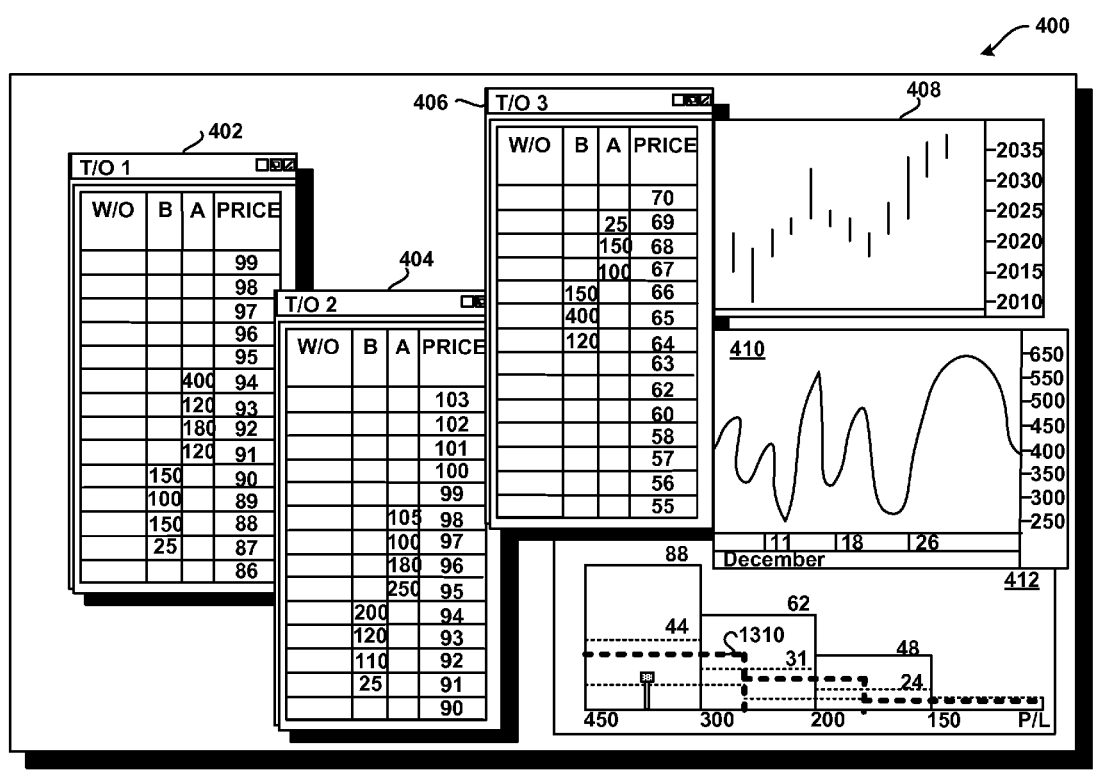
FIG. 4 is a block diagram illustrating a first virtual workspace that can be displayed on a display screen.
Figure 5:
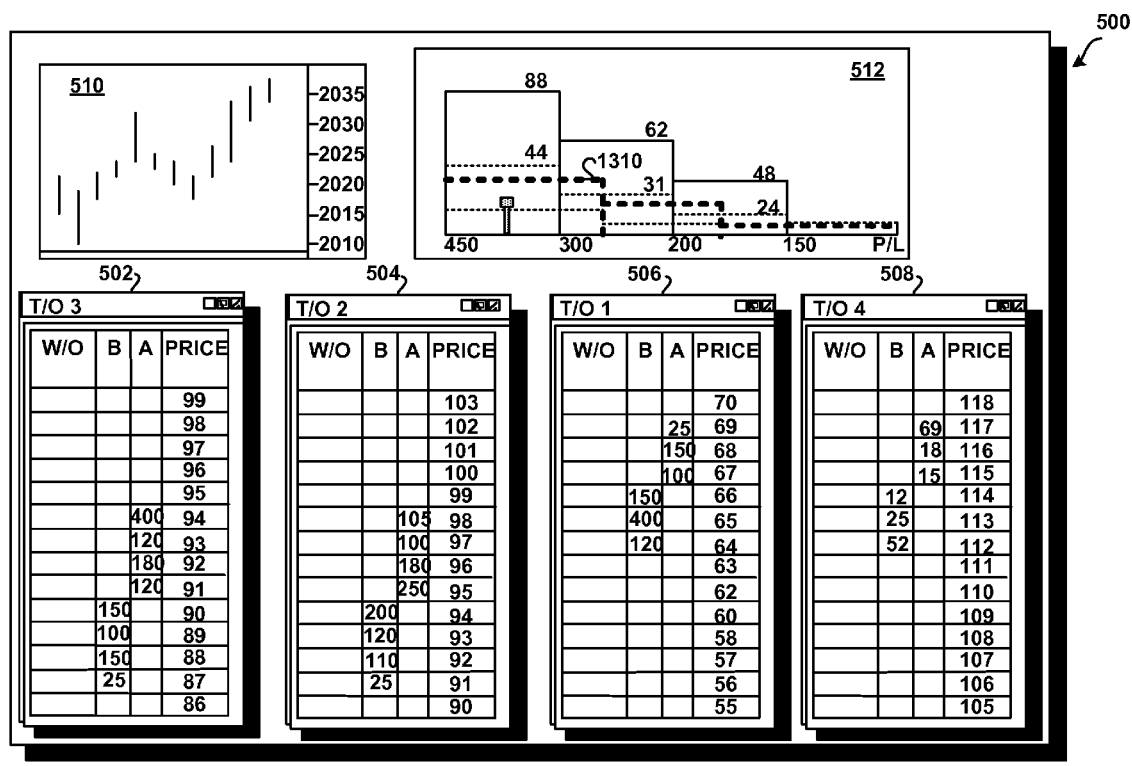
FIG. 5 is a block diagram illustrating a second virtual workspace that can be displayed on the display screen of FIG. 4 upon detecting one or more preset triggering events.

FIGS. 4 and 5 are block diagrams illustrating two different workspaces 400 and 500 that can be displayed on the same display screen upon detecting one or more preset triggering events. Referring first to FIG. 4, the workspace 400 includes three trading interfaces 402, 404, and 406 that can be used to trade three different tradeable objects (T/O 1-T/O 3) that can be offered at one or more exchanges. The workspace 400 also includes three additional windows 408, 410, and 412, where the windows 408 and 410 display two market-related charts, and the window 412 displays risk-related information, for example. It should be understood that the types of windows illustrated in relation to the workspace 400 of FIG. 4 as well as to the workspace 500 of FIG. 5 are only examples, and different types of windows could also be displayed, such as order book windows or fill windows. Also, the trading interfaces windows 402-406 can be controlled by one or more trading applications, while other windows, such as the windows 408 and 410 can be controlled by one or more charting applications that are independent and separate from the trading applications.

As mentioned in earlier paragraphs, upon detecting one more triggering events predefined by a trader, the workspace 400 or at least some of the windows associated with the workspace 400 may be replaced with a set of different windows associated with a different virtual workspace. Also, as mentioned in earlier paragraphs, some workspaces may share one or more windows, and some windows can be tagged with one or more identifiers preventing other windows associated with a different workspace to be displayed on top of the marked windows.

FIG. 5 illustrates the display interface of FIG. 4 at some later time upon detecting one or more triggering events that have been defined to activate the workspace 500. The workspace 500 includes four trading interface windows 502, 504, 506, and 508 associated with four tradeable objects (T/O 1-T/O 4), where the trading interface windows 504 and 506 associated with the T/O 2 and T/O 1 correspond to the trading interface windows 404 and 402 of FIG. 4. Also, the windows 510 and 512 correspond to the windows 408 and 412, respectively. It should be understood that the workspace 500 could include an entirely different set of windows than that associated with the display interface of FIG. 4. Also, it should be understood that the position of the windows on the two workspaces 400 and 500 could be determined based on user workspace configurations.

Figure 6A:
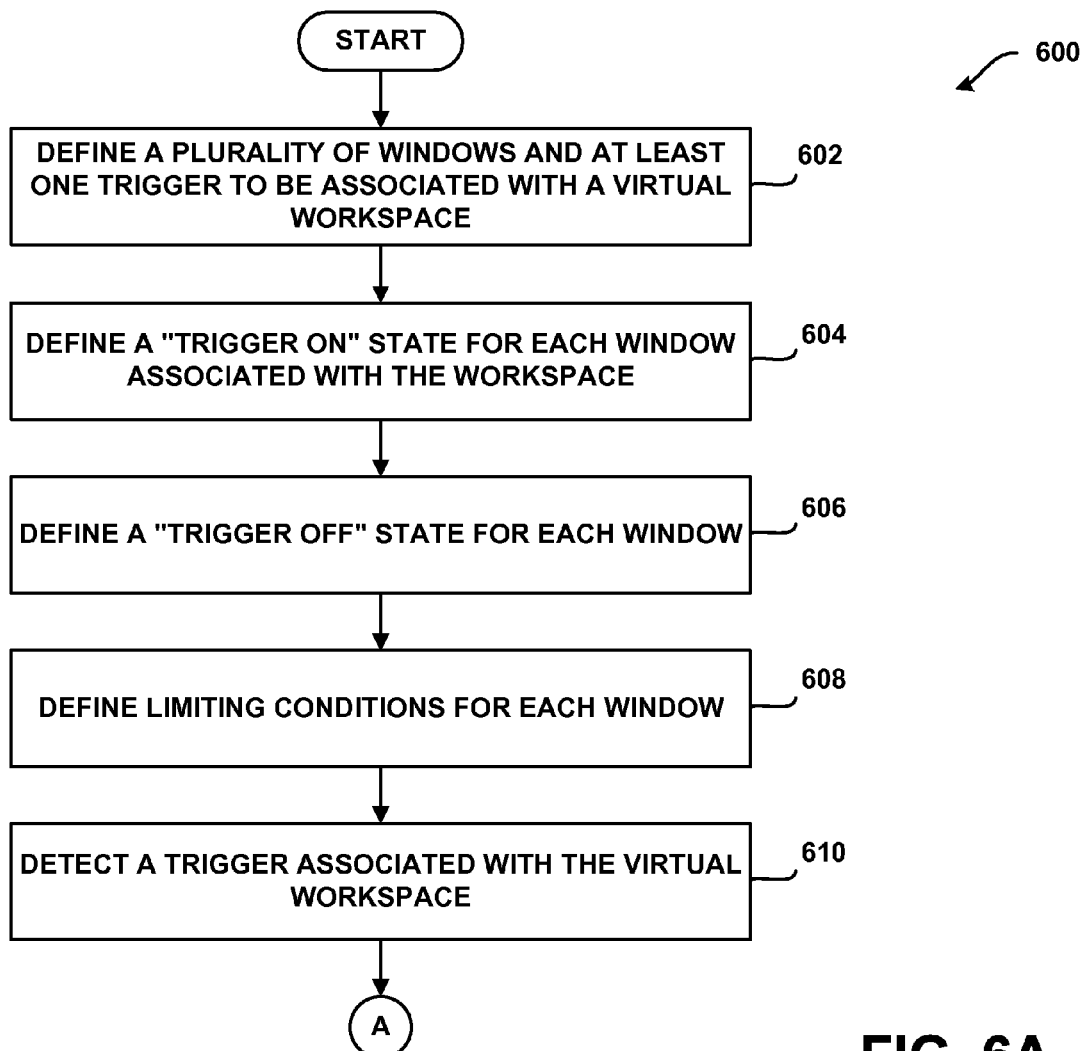
FIGS. 6A and 6B are a flow chart illustrating a method for processing virtual workspaces according to one example embodiment.
Figure 6B:
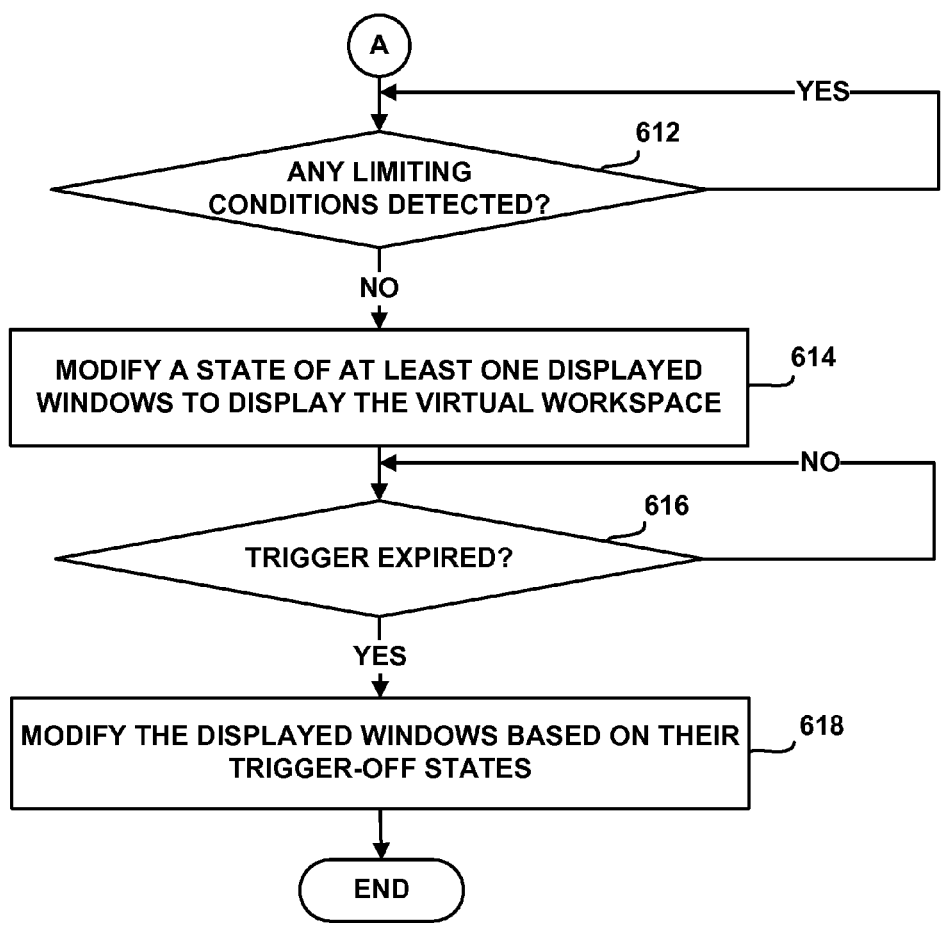

FIGS. 6A and 6B are a flow chart illustrating a method 600 for controlling virtual workspaces according to one example embodiment. Referring to FIG. 6A, at step 602, a trader may define a plurality of windows and trigger to be associated with a virtual workspace. As mentioned in earlier paragraphs, the trigger can take many different formats including trader-related triggers, market-related triggers, news-related triggers, time-based triggers, user initiated triggers that can be based on user inputs, or the combination thereof. Also, a trigger associated with a virtual workspace could include an unlimited combination of conditions that have to be met before determining that the trigger has been detected. For example, a trigger could take a format of any Boolean expression, such as If {(Monday AND Price>1,000) OR (Tuesday AND Price<1,000)}, or any other more or less complex Boolean expression. However, it should be understood that different trigger conditions could also be used, and the example embodiments are not limited to the trigger conditions provided above.

At step 604, a trader may define a "trigger on" state for each window associated with the workspace. It should be understood that the "trigger on" state may simply include a request to activate a window. However, the trigger on state may define additional limitations such as the initial size of the window, a position of the window on a screen in relation to other windows, or any other window characteristics. At step 606, the trader may define a "trigger off" state for each window, such as window characteristics upon detecting the expiration of one or more triggers associated with the virtual workspace. In one embodiment, the "trigger off" state may simply include a request to deactivate a window. However, it should be understood that different window states could be defined for the "trigger off" state. For example, upon detecting the "trigger off" state, the window's size, transparency, or z-order could be changed.

At step 608, the trader may define a number of limiting conditions for each window. Such limiting condition, as mentioned in earlier paragraphs, may be used to prevent other windows from fully or partially replacing a window associated with the limiting condition. The limiting conditions may be based on many different factors, including user-related actions or any pre-assigned window characteristics. Also, the limiting conditions could take a format of messages informing a trader about detecting one or more triggers associated with the workspace. Such messages may include a query whether one or more currently displayed windows should be replaced with a new set of windows associated with a new workspace.

At step 610, the virtual workspace application may detect a trigger activating a virtual workspace. Then, at step 612, the virtual workspace application may check for any limiting conditions associated with a set of currently displayed windows. The example limiting conditions have been described above. For example, the limiting conditions may include detecting a user action in relation to one or more windows being currently displayed on a display unit. If any limiting conditions are detected, the method 600 may continue at step 612, where the virtual workspace application may keep checking if the limiting conditions are still present. Referring back to step 612, if no limiting conditions are detected, at step 614, the virtual workspace application will modify a state of at least one currently displayed window to display the virtual workspace. The modification of the currently displayed windows can take many different formats, such as changing the focus, z-order, size, color, or fully deactivating the current workspace and replacing it with a new workspace. However, those skilled in the art will recognize that different window modifications are possible as well, and the present embodiments for event driven virtual workspaces are not limited to the embodiments described herein.

At step 616, the virtual workspace application may determine if the trigger associated with the activated workspace has expired. The expiration of the trigger associated with the activated virtual workspace could be time based; however, a trader could define different events that may activate the expiration of the triggers. For example, if a virtual workspace is activated upon detecting that a market price is within a predetermined price range, the trigger may automatically expire when the market moves away from the predefined price range. However, it should be understood that different embodiments are possible as well. Also, if a trigger includes a number of conditions that have to be met for the trigger to activate the virtual workspace, depending on user preferences, if one of such conditions is no longer present, the trigger may be considered expired. Alternatively, more than one condition has to expire in order for the system to consider the trigger expired. It should be understood that the configuration may depend on user preferences.

If the trigger expiration has been detected, at step 618, the currently displayed windows associated with the virtual workspace can be modified based on their "trigger off" states. For example, based on the trigger off states associated with the displayed windows, the virtual workspace application can deactivate the currently displayed windows, and the display can be restored to the state before the virtual workspace has been activated.

It should be understood that the example method 600 described in reference to FIG. 6 represents only one possible implementation describing the operation of the virtual workspace. According to another embodiment, triggers associated with different workspaces could be assigned a number of priority levels, such that if more than one trigger is detected, the priority levels associated with specific triggers could be used by the virtual workspace application to determine which of the workspaces is to be displayed on a display. For example, if a trigger associated with a currently displayed virtual workspace has a higher hierarchy level than a newly detected trigger associated with another workspace, the virtual workspace application may stop the new workspace from being activated on the display. Different priority level configurations are possible as well.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for event driven virtual workspace in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for an event driven workspace in an electronic trading environment, the method including:
   receiving by a computing device a first definition for a first virtual workspace, wherein the first virtual workspace is associated with a plurality of windows, wherein the plurality of windows are for at least two applications, wherein the plurality of windows display information pertaining to one or more tradeable objects, wherein the first virtual workspace provides a first predefined layout for the plurality of windows, wherein the first predefined layout includes a location for each of the plurality of windows;
   receiving by the computing device a second definition for a second virtual workspace, wherein the second virtual workspace is associated with the plurality of windows, wherein the second virtual workspace provides a second predefined layout for the plurality of windows, wherein the second predefined layout includes a location for each of the plurality of windows, wherein the second predefined layout is different from the first predefined layout, wherein the second virtual workspace is associated with a triggering event definition;
   receiving by the computing device a limiting condition definition for a limiting condition, wherein the limiting condition definition is associated with one of the plurality of windows;
   displaying by the computing device the plurality of windows according to the first predefined layout of the first virtual workspace;
   determining by the computing device whether a triggering event has occurred based on the triggering event definition associated with the second virtual workspace by monitoring data related to the one or more tradable objects;
   detecting by the computing device the triggering event based on the monitored data;
   determining by the computing device whether the limiting condition is satisfied for the associated window based on the limiting condition definition when the triggering event has been detected; and
   activating by the computing device the second virtual workspace in response to detecting the triggering event, wherein activating the second virtual workspace includes displaying the plurality of windows according to the second predefined layout of the second virtual workspace except for the window associated with the limiting condition definition when the limiting condition has been detected to be satisfied.

2. The method of claim 1, wherein the limiting condition definition is associated with the first virtual workspace.

3. The method of claim 1, wherein the limiting condition is based on a user action.

4. The method of claim 3, wherein the user action is movement of a cursor within a window of the plurality of windows.

5. The method of claim 4, wherein the movement of the cursor is detected within a predetermined time period.

6. The method of claim 3, wherein the user action is an input in relation to a window within a predetermined time period.

7. A computer readable medium having stored therein instructions executable by a processor to perform a method comprising:

receiving by a computing device a first definition for a first virtual workspace, wherein the first virtual workspace is associated with a plurality of windows, wherein the plurality of windows are for at least two applications, wherein the plurality of windows display information pertaining to one or more tradeable objects, wherein the first virtual workspace provides a first predefined layout for the plurality of windows, wherein the first predefined layout includes a location for each of the plurality of windows;

receiving by the computing device a second definition for a second virtual workspace, wherein the second virtual workspace is associated with the plurality of windows, wherein the second virtual workspace provides a second predefined layout for the plurality of windows, wherein the second predefined layout includes a location for each of the plurality of windows, wherein the second predefined layout is different from the first predefined layout, wherein the second virtual workspace is associated with a triggering event definition;

receiving by the computing device a limiting condition definition for a limiting condition, wherein the limiting condition definition is associated with one of the plurality of windows;

displaying at the computing device the plurality of windows according to the first predefined layout of the first virtual workspace;

determining by the computing device whether a triggering event has occurred based on the triggering event definition associated with the second virtual workspace by monitoring data related to the one or more tradable objects;

detecting by the computing device the triggering event based on the monitored data;

determining by the computing device whether the limiting condition is satisfied for the associated window based on the limiting condition definition when the triggering event has been detected; and activating by the computing device the second virtual workspace in response to detecting the triggering event, wherein activating the second virtual workspace includes displaying the plurality of windows according to the second predefined layout of the second virtual workspace except for the window associated with the limiting condition definition when the limiting condition has been detected to be satisfied.

8. The computer readable medium of claim 7, wherein the limiting condition definition is associated with the first virtual workspace.

9. The computer readable medium of claim 7, wherein the limiting condition is based on a user action.

10. The computer readable medium of claim 9, wherein the user action is movement of a cursor within a window of the plurality of windows.

11. The computer readable medium of claim 10, wherein the movement of the cursor is detected within a predetermined time period.

12. The computer readable medium of claim 9, wherein the user action is an input in relation to a window within a predetermined time period.

* * * * *